(12) United States Patent
Bataille et al.

(10) Patent No.: US 8,148,856 B2
(45) Date of Patent: Apr. 3, 2012

(54) STAND-ALONE DEVICE FOR GENERATING ELECTRICAL ENERGY

(75) Inventors: Christian Bataille, Voiron (FR); Christophe Cartier-Millon, Saint Martin d'heres (FR); Stephane Follic, Grenoble (FR); Jean-Pierre Pin, Saint Etienne de Saint Geoirs (FR); Didier Vigouroux, Villard Bonnot (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 542 days.

(21) Appl. No.: 12/094,242

(22) PCT Filed: Oct. 25, 2006

(86) PCT No.: PCT/EP2006/067755
§ 371 (c)(1),
(2), (4) Date: May 19, 2008

(87) PCT Pub. No.: WO2007/060072
PCT Pub. Date: May 31, 2007

(65) Prior Publication Data
US 2008/0315595 A1 Dec. 25, 2008

(30) Foreign Application Priority Data
Nov. 22, 2005 (FR) ..................................... 05 53539

(51) Int. Cl.
*F03G 5/00* (2006.01)
(52) U.S. Cl. ........................... 310/36; 310/152; 290/1 R
(58) Field of Classification Search .................. 310/152, 310/36; 290/1 R
See application file for complete search history.

(56) References Cited

U.S. PATENT DOCUMENTS

| 4,727,344 | A | * | 2/1988 | Koga et al. ...................... 335/78 |
| 5,349,256 | A | * | 9/1994 | Holliday .................... 310/12.24 |
| 7,710,227 | B2 | * | 5/2010 | Schmidt ........................ 335/302 |
| 2003/0048018 | A1 | * | 3/2003 | Sadarangani et al. ........ 310/152 |

FOREIGN PATENT DOCUMENTS

| DE | 21 14 784 | | 10/1971 |
| DE | 196 20 880 | | 11/1997 |
| DE | 103 01 192 | | 7/2004 |
| FR | 2847071 | A1 * | 5/2004 |
| JP | 2000 287470 | | 10/2000 |
| WO | 2004 017501 | | 2/2004 |
| WO | 2004 093299 | | 10/2004 |

OTHER PUBLICATIONS

U.S. Appl. No. 12/528,453, filed Aug. 25, 2009, Bataille, et al.

* cited by examiner

*Primary Examiner* — Quyen Leung
*Assistant Examiner* — Naishadh Desai
(74) *Attorney, Agent, or Firm* — Oblon, Spivak, McClelland, Maier & Neustadt, L.L.P.

(57) ABSTRACT

The present invention relates to a stand-alone device for generating electrical energy comprising:—an excitation coil (2) furnished with a central opening, —a magnetic circuit passing through the central opening of the coil and formed of a fixed part (3) and a movable part (5) that can move with respect to the fixed part (3) so as to vary the magnetic flux through the excitation coil (2), characterized in that, —the magnetic circuit passes through the central opening of the excitation coil (2) several times, forming at least one loop. The invention also relates to a remote control device comprising a transmitter coupled to a remote receiver and a stand-alone device (1) for generating electrical energy so as to generate an electric current intended to power its transmitter.

19 Claims, 3 Drawing Sheets

STAND-ALONE DEVICE FOR GENERATING ELECTRICAL ENERGY

Figure 1:
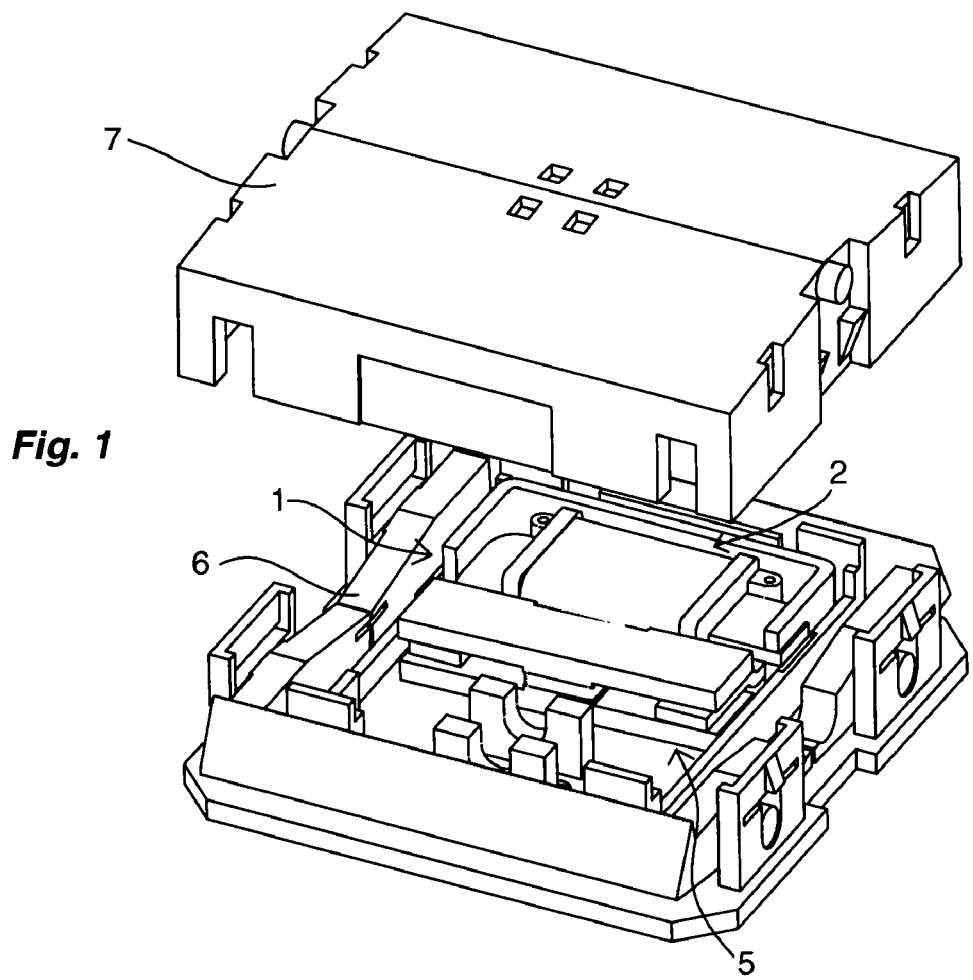

The present invention relates to a standalone device for generating electrical energy. The inventive device uses the variation of the magnetic flux through an induction coil to create an electric current. The present invention also relates to a remote control device powered by the standalone device for generating electrical energy.

Hereinafter in the description, the term "standalone device for generating electrical energy" will be used to mean a device that makes it possible to create an electric current with no current source and with no connection to an electrical network, that is wirelessly.

US patent application 2003/048018 discloses an electrical machine comprising a stator provided with a plurality of magnetic conductors, an electrical conductor consisting of a winding extending through each magnetic conductor and a moving part comprising a plurality of permanent magnets, this moving part being able to move relative to the stator to create an electric current in the winding. Each magnetic conductor forms with permanent magnets a magnetic circuit extending around a part of the winding. In this document, the magnetic flux created is divided into two and the flux variation obtained in the coil is therefore not sufficient to create an electric current with a sufficiently strong intensity.

Also known from patent application WO 2004/093299 is a converter of mechanical energy into electrical energy. This converter comprises a permanent magnet and a soft magnetic element, the two forming a magnetic circuit and an electrical coil surrounding a part of the magnetic circuit. The soft magnetic element and the permanent magnet are fitted to rotate relative to each other, which then allows for a movement to create a flux variation in the magnetic circuit passing through the coil, resulting in the generation of an electric current in the coil.

Document WO 2004/093299 provides for the use of the converter in a standalone energy switch, that is one that has no energy source and is wireless. When the switch is mechanically activated, the electric current generated by the variation of the magnetic flux passing through the coil makes it possible to power a radio signal transmitter. The radio signal is sent to a remote receiver which is then responsible for switching on an electrical appliance. When the switch is very far from the receiver or separated from the latter by numerous obstacles, the radio signal generated is not always sufficient to reach the receiver in all cases. To improve the performance of the converter, the number of turns of the coil must be increased, so increasing the size of the switch and, given the cost of the copper wire used for the winding, making it much more costly.

The aim of the invention is to propose a device for generating electrical energy of the type described above, presenting enhanced performance while retaining a small footprint and modest cost.

This aim is achieved by a standalone device for generating electrical energy comprising:
an excitation coil provided with a central opening,
a magnetic circuit passing through the central opening of the coil and made of a fixed part and a moving part able to move relative to the fixed part to vary the magnetic flux through the excitation coil and so create an electric current in the excitation coil,
characterized in that,
the magnetic circuit passes several times through the central opening of the excitation coil forming at least one loop.

According to a particular feature of the invention, the magnetic circuit passes twice through the central opening of the excitation coil forming a loop.

According to another particular feature, the magnetic circuit passes twice through the central opening of the excitation coil by its fixed part forming a loop.

Thus, in a device for generating electrical energy which comprises a magnetic circuit passing twice through the excitation coil forming a loop thereof, the inductance is increased and therefore so too is the quantity of energy stored in the coil according to the relation $E=\frac{1}{2}\cdot L\cdot I^2$, in which E is the energy stored in the coil, L is the inductance of the coil and I is the intensity of the current created by the variation of the magnetic flux through the coil.

Because of this, for a given operating speed of the moving part and for one and the same number of turns of the coil, the current generated by the magnetic flux variation through the coil in the inventive device is multiplied by a factor of 2 compared to that generated in a prior-art device in which the magnetic circuit passes only once through the coil. According to the relation defined above, the energy E stored in the coil is therefore also multiplied by 2 in the inventive device, compared to that generated in a prior art device.

Furthermore, the ferromagnetic material used to produce the magnetic circuit, such as, for example, iron, is much less costly than the copper employed to form the turns of the coil. It would therefore be thoroughly advantageous and cost-effective to minimize the quantity of copper needed to improve the performance of the device by offsetting it with an increase in the quantity of iron used.

The increase in the length of the magnetic circuit tends naturally, by its very principle, to increase the inductance (greater length of iron with identical flux) which therefore increases the energy stored in the coil according to the relation $E=\frac{1}{2}\cdot L\cdot I^2$ already defined above.

According to the invention, the coil will make it possible to recover the energy linked to a flux variation and to the speed of this variation. The increased energy-generation performance is also achieved by adjusting the voltage peak which is linked to the speed of variation of the magnetic flux through the coil. The speed of variation of the magnetic flux corresponds to the speed of the movement of the moving part of the magnetic circuit relative to its fixed part.

Thus, the inventive device makes it possible to obtain enhanced performance compared to that of a prior-art device without increasing its size and its footprint, or to obtain performance equivalent to that of a prior art device but with a smaller size and footprint.

According to another particular feature, the fixed part comprises a seat linked to two arms that are not joined, a first arm and a second arm, each passing through the central opening of the excitation coil.

According to the invention, the fixed part of the magnetic circuit is therefore produced in three separate parts, the seat and the two arms. In production, the two arms are passed through the central opening of the coil and each leg of the seat is then linked to one end of an arm which creates a perfectly rigid complete subassembly. The arms can be embedded in the material comprising the keeper of the coil.

According to the invention, a magnetic field circulating in the magnetic circuit travels a path passing through the moving part, the first arm, the seat and the second arm, before returning to the moving part, the passage of the magnetic field being in one and the same direction in both arms.

According to another particular feature, each arm has a free end forming an end stop for the moving part.

According to another particular feature, the seat presents a U-shape comprising two parallel legs straddling the excitation coil. The parallel legs of the seat each include, for example, a slot to receive one end of an arm.

According to another particular feature, the moving part comprises a moving permanent magnet able to perform a rotation movement. The rotation movement of the permanent magnet is, for example, a rocker-arm movement performed between two extreme positions delimited by end stops. The end stops are, for example, formed by the free end of the arms passing through the coil.

Advantageously, the moving part is fitted on elastic means stressing the moving part toward one of the extreme positions.

According to a particular feature, the moving part presents an H-shape and consists of the permanent magnet held between two parallel ferromagnetic layers.

According to another particular feature, the permanent magnet presents a direction of magnetization that is perpendicular to the planes defined by the two ferromagnetic layers.

According to another particular feature, the moving part is operated manually. The device is then operated by a rocker- or pushbutton-type switch. The moving part can also be moved by a mechanical device in a position detector.

According to the invention, the device can be manufactured using MEMS technology.

The invention also relates to a remote control device comprising a transmitter coupled to a remote receiver, and a standalone device for generating electrical energy as described previously, to generate an electric current intended to power the transmitter.

Figure 2:
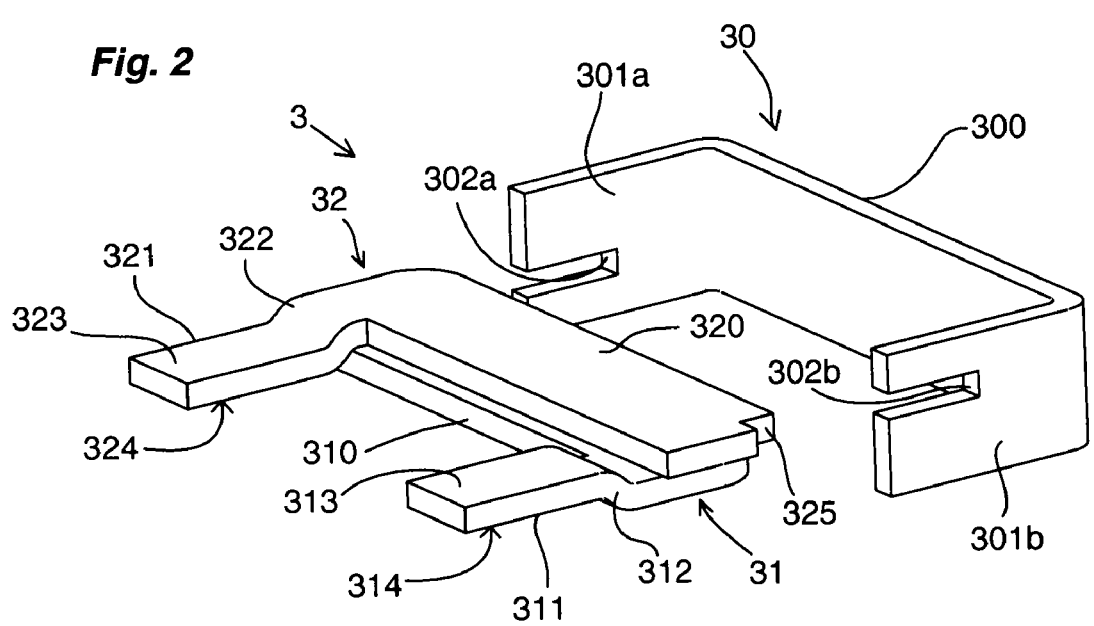
Figure 3:
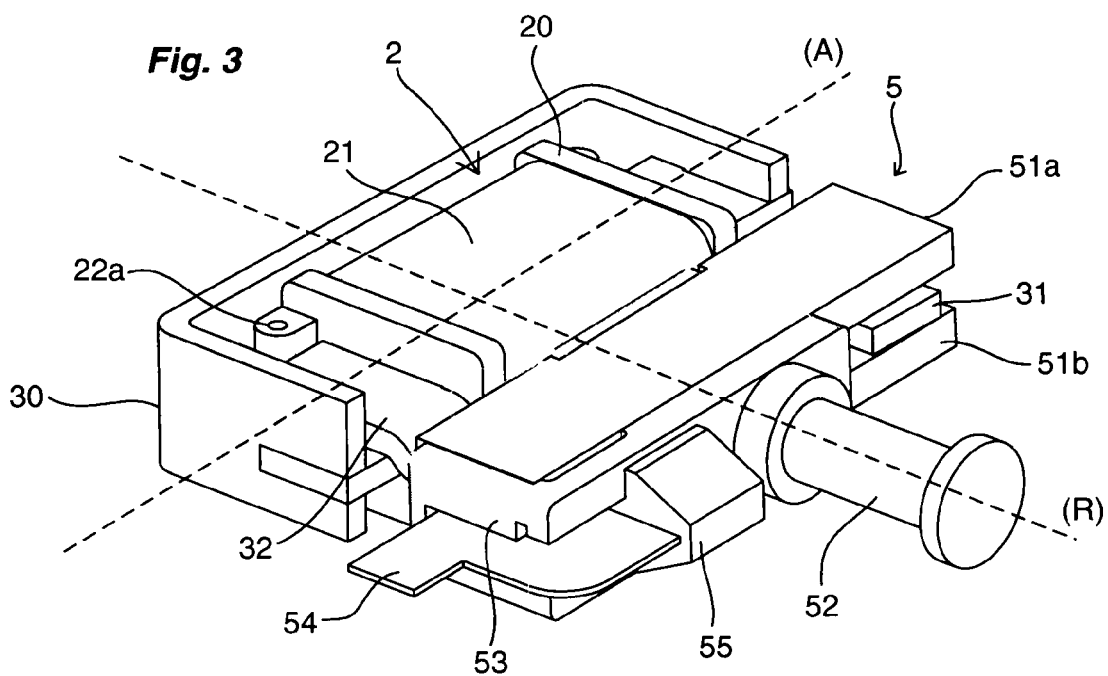
Figure 4:
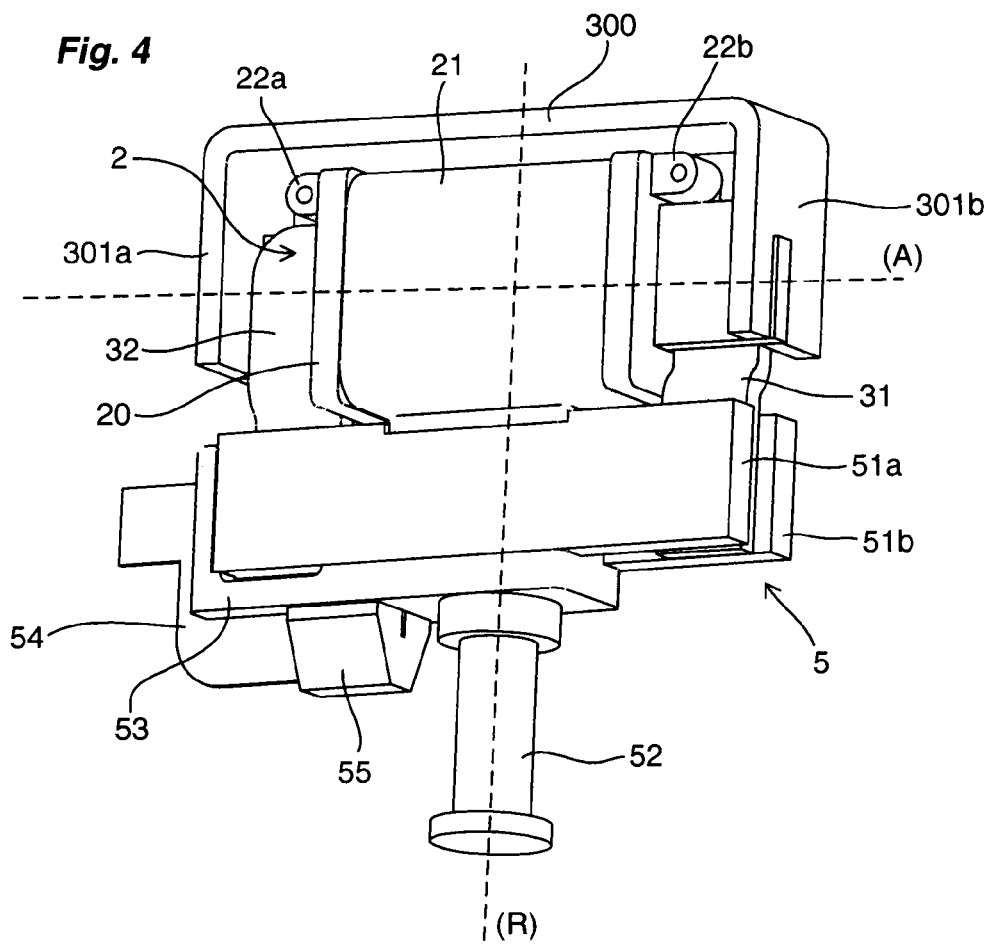
Figure 5:
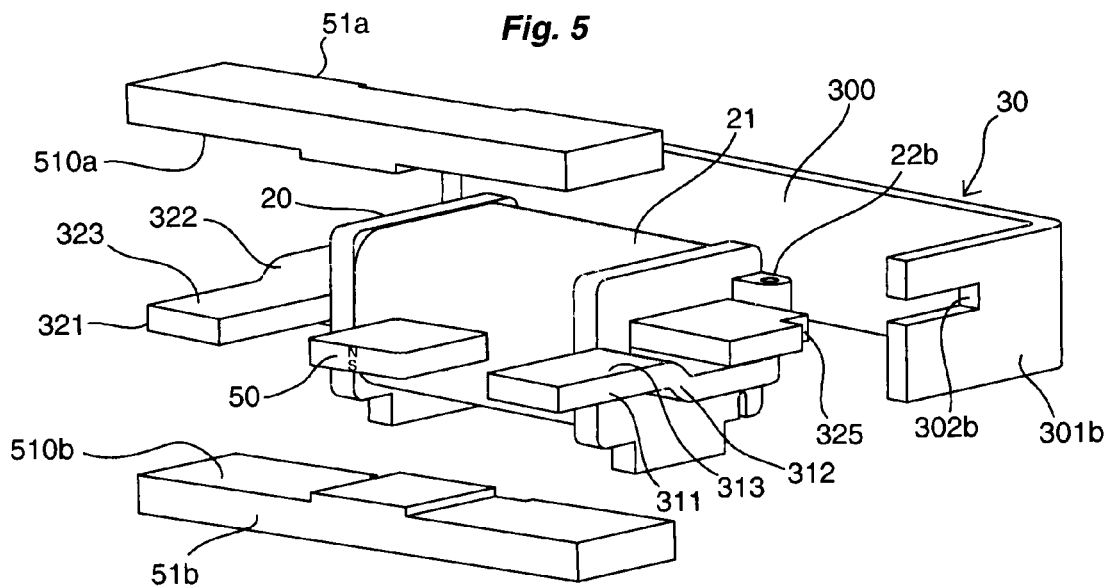
Figure 6A:
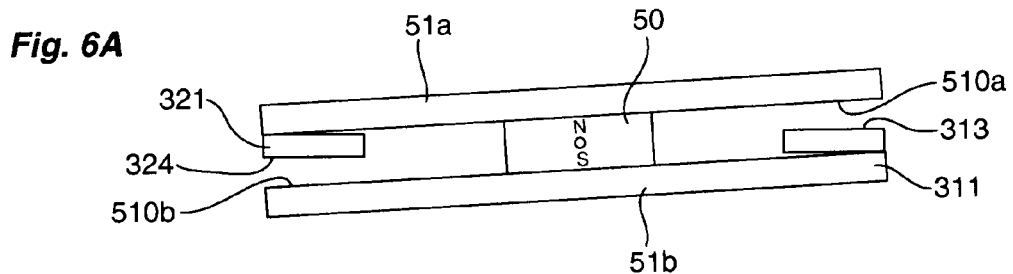
Figure 6B:
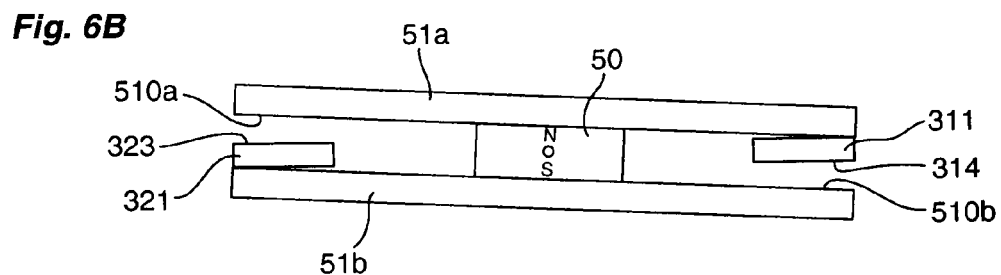
Figure 7:
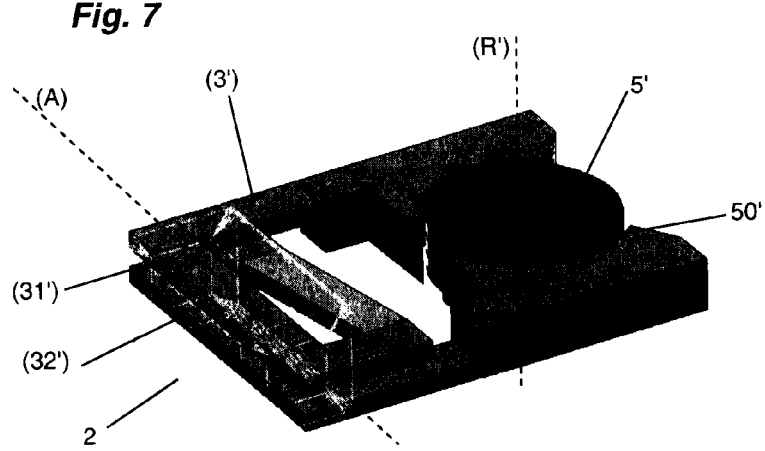

Other characteristics and advantages will become apparent from the detailed description that follows, by referring to a given embodiment by way of example and represented by the appended drawings in which:

FIG. 1 represents a subassembly of a remote control device powered by a standalone device for generating electrical energy according to the invention, FIG. 2 represents in an exploded view the fixed part of the magnetic circuit used in the inventive device, FIG. 3 is a three-quarter view representing the standalone device for generating electrical energy according to the invention, configured to be installed in a remote control device, FIG. 4 is a view from above representing the standalone device for generating electrical energy according to the invention, configured to be installed in a remote control device, FIG. 5 is an exploded view representing the inventive device, FIGS. 6A and 6B are diagrammatic front views representing the moving part respectively in a first extreme position and in a second extreme position, FIG. 7 diagrammatically represents an embodiment variant of the inventive device.

Hereinafter in the description, the terms "top" and "bottom" and the other equivalent expressions employed should be understood by taking a vertical direction axis as the reference in the appended drawings.

The standalone device 1 for generating electrical energy according to the invention makes it possible to generate an electric current in an excitation coil 2 by varying the magnetic flux passing through the coil 2 by an external mechanical action, for example manual.

Such a device 1 can be used in a remote control device that is wireless and has no internal current source. This remote control device is, for example, operated manually by a rocker- or pushbutton-type switch able to control a light, and can be positioned without constraint in various places in a room. The remote control device notably comprises a mechanical subassembly represented in FIG. 1. This mechanical subassembly is intended to receive the standalone device 1 for generating electrical energy according to the invention and also comprises operating means 6, 7 for transmitting a mechanical energy to the device 1 for generating electrical energy. The remote control device also comprises a transmitter (not represented) powered by the current produced by the device 1 to send radio signals to a remote receiver and electronic circuits (not represented) notably comprising means of storing the electrical energy generated by the device 1 according to the invention, such as capacitors, to smooth the quantity of current to be delivered downstream to the transmitter.

The standalone device 1 for generating electrical energy according to the invention can also be implemented for other applications such as, for example, a position detector or a mechanical pressure sensor in which the quantity of current generated and measured makes it possible to determine whether a mechanical force has been exerted. The mechanical action makes it possible to create an electric current which is used to trigger, for example, an alarm or a signaling device, or to power a radio transmitter as described previously.

Referring to FIGS. 2 to 6B, the device 1 according to the invention notably comprises a magnetic circuit consisting of a fixed part 3 and a moving part 5, through which a magnetic field can circulate, and an excitation coil 2. It can be made using MEMS (Micro Electro-Mechanical System) technology. The MEMS technology is well known and consists in stacking successive layers, one of the layers being a sacrificial layer which is then eliminated, for example by etching, to free up a moving part.

The magnetic flux in the magnetic circuit is defined by the instantaneous angular position of the moving part 5 relative to the fixed part 3, such that the movement of the moving part 5 relative to the fixed part 3 creates a variation of the magnetic flux through the coil 2 which causes an electric current to be created in the coil 2. The voltage created at the terminals of the coil 2 by the variation of the magnetic flux depends on the time and therefore the speed of movement of the moving part 5 relative to the fixed part 3.

The excitation coil 2 comprises an keeper 20 produced in an amagnetic material, on which is wound a coil 21 of N turns of a conductive wire (FIGS. 3 and 4). The keeper 20 has a central opening formed on a longitudinal axis (A), and the dimensions of which are adapted so that it can be passed through several times by the magnetic circuit. In the figures, the fixed part 3 of the magnetic circuit passes twice through the central opening of the coil 2 forming a loop. The magnetic circuit therefore passes a first time through the central opening of the coil 2, then winds around the coil 2 to form the loop, and passes a second time through the central opening of the coil 2. The keeper 20 of the excitation coil includes barrel fixings 22a, 22b intended to receive the two ends of the conductive wire of the coil 2 to connect them to an electronic card (not represented) positioned above the keeper 20.

The moving part 5 of the magnetic circuit for example presents a symmetrical H-shape comprising, for example, a permanent magnet 50 held between two parallel layers 51, 51b of ferromagnetic material, a top layer 51a and a bottom layer 51b. The permanent magnet 50 is fixed to the internal faces 510a, 510b of the bottom layer 51a and of the top layer 51b. This moving part 5 is fitted to rotate on a horizontal rotation axis (R) that is perpendicular to the longitudinal axis (A) of the central opening of the keeper 20. The rotation axis (R) is represented in FIGS. 3 and 4 by a cylindrical piece 52 joined to a support piece 53 fitted on the moving part 5 and joined to rotate with the moving part (5). The permanent magnet is south-north polarized, in a vertical direction perpendicular to the rotation axis (R) of the moving part 5, for example from bottom to top (FIGS. 6A and 6B).

The fixed part 3 of the magnetic circuit is made of a material with high magnetic permeability such as a ferromagnetic material. Referring to FIG. 2, the fixed part 3 comprises a U-shaped seat 30 straddling the excitation coil 2 (FIG. 4) to form the loop. The seat 30 thus presents a first leg 301*a* and a second leg 301*b* that are parallel to each other and separated by a central core 300. The two legs 301*a*, 301*b* extend either side of the excitation coil 2 without passing through the central opening of the keeper 20, in a direction parallel to the rotation axis (R) of the moving part 5. The free end of each leg 301*a*, 301*b* presents a slot 302*a*, 302*b*.

Referring to FIG. 2, the fixed part 3 of the magnetic circuit also comprises a first arm 31 and a second arm 32 that are separate, not connected and not the same, one of the arms being the mirror image of the other. These arms 31, 32 are L-shaped and each present, from a first end, a long branch 310, 320 then a shorter branch 311, 321 terminated by a second free end. They are also provided at the junction of their two branches with a gently inclined portion 312, 322. The long branches 310, 320 of these two arms 31, 32 pass separately through the central opening of the keeper 20 on two planes parallel to the longitudinal axis (A) of the central opening of the coil 2. The first arm 31 is linked by its first end to the first leg 301*a* of the seat 30 and the second arm 32 is connected by its first end to the second leg 301*b* of the seat 30. An alignment discontinuity 325 produced on the first end of each arm 31, 32 makes it possible to engage the arm 31, 32 in the slots 302*a*, 302*b* of the leg 301*a*, 301*b* to which it is linked. Outside of the central opening, the inclined portions 312, 322 of each of the arms 31, 32 return the short branches 311, 321 to one and the same horizontal plane, in which is also located the rotation axis (R) of the moving part 5. The second ends of each of the arms 31, 32 are positioned either side of the permanent magnet 50 of the moving part 5 and between the two ferromagnetic layers 51*a*, 51*b* of the moving part 5. The short branch 311, 321 of each arm 31, 32 forms an end stop for the moving part 5 and defines two opposing bearing lands, a top bearing land 313, 323 and a bottom bearing land 314, 324. The moving part 5 presents a degree of freedom in rotation between the end stops formed by each of the arms 31, 32.

According to the invention, appropriate guidance means, for example made of plastic materials, are provided inside the central opening of the keeper 20 so as to guide and maintain each arm 31, 32 at a sufficient distance from the other, so as not to disturb the circulation of the magnetic field in the magnetic circuit and to avoid leaks between the arms 31, 32.

Since the seat 30 is arranged for its two legs 301*a*, 301*b* to be positioned either side of the coil 2, the magnetic field circulating in the arms 31, 32 always passes through the central opening of the coil 2 in the same direction. Consequently, the magnetic field passes through the central opening of the excitation coil 2 twice in the same direction. If the central opening of the excitation coil is passed through more than twice by the magnetic circuit, the magnetic field created passes through the central opening of the excitation coil in the same direction, as many times as the coil is passed through.

According to the invention, the fixed part 3 of the magnetic circuit is therefore made in three separate parts, the seat 30 and the two arms 31, 32. In production, the two arms 31, 32 are passed through the central opening of the coil 2 and each leg 301*a*, 301*b* of the seat 30 is then linked to the first end of an arm 31, 32 which makes it possible to create a perfectly rigid compact subassembly. According to the invention, the two arms 31, 32 can also be embedded in the material forming the keeper 20 of the excitation coil 2 to form a perfectly rigid piece consisting of a coil 2 and the arms 31, 32.

According to the invention, the sections of the various elements made of magnetic material are determined for the magnetic circuit to present a minimum of saturation in the ranges of use of the standalone device 1 for generating energy.

The moving part 5 performs a rocker-arm movement about its axis (R) and assumes two distinct extreme positions defined by the end stops, in each of which the moving part 5 is retained by magnetic forces. When the moving part is lifted from one of its extreme positions, beyond a central balance position, it is instantaneously attracted by magnetic effect to the other extreme position. This phenomenon is notably described in GB patent application 1 312 927.

In the first extreme position (FIG. 6*a*), the internal face 510*b* of the bottom layer 51*b* of the moving part 5 is stuck by magnetic force against the bottom bearing land 314 of the short branch 311 of the first arm, whereas the internal face 510*a* of the top layer 51*a* of the moving part 5 is stuck by magnetic force against the top bearing land 323 of the short branch 321 of the second arm 32.

In the first extreme position, the magnetic field circulating within the magnetic circuit travels the following path:
  permanent magnet 50,
  top layer 51*a* of the moving part 5,
  second arm 32,
  second leg 301*b* of the seat 30,
  central core 300 of the seat 30,
  first leg 301*a* of the seat 30,
  first arm 31,
  bottom layer 51*b* of the moving part 5,
  permanent magnet 50.

In the second extreme position (FIG. 6B), the internal face 501*a* of the top layer 51*a* of the moving part 5 is stuck by magnetic force against the top bearing land 313 of the short branch 311 of the first arm 31, whereas the internal face 510*b* of the bottom layer 51*b* of the moving part 5 is stuck by magnetic force against the bottom bearing land 324 of the short branch 321 of the second arm 32.

In the second extreme position, the magnetic field circulating within the magnetic circuit travels the following reverse path:
  permanent magnet 50,
  top layer 51*a* of the moving part 5,
  first arm 31,
  first leg 301*a* of the seat 30,
  central core 300 of the seat 30,
  second leg 301*b* of the seat 30,
  second arm 32,
  bottom layer 51*b* of the moving part 5,
  permanent magnet 50.

The magnetic field formed in the magnetic circuit is therefore oriented in the same direction in both arms 31, 32 passing through the coil 2.

In a mechanical-switch-type application, a spring plate 54 (FIGS. 3 and 4) is fitted joined on the one hand to the operating means 6, 7 of the device (FIG. 1) and on the other hand to the moving part 5 via a piece 55 with triangular section linked to the support piece 53, itself fitted on the moving part 5. The spring plate 54 is dimensioned to be abruptly distorted when a certain quantity of mechanical energy is provided to operate the moving part 5 rotation-wise. When operated, the spring plate 54 therefore makes it possible to store the mechanical energy up to a certain threshold before provoking the rocking of the moving part 5. The spring plate 54 thus makes it possible to confer on the inventive device 1 a constant operating dynamic that is independent of the mechanical pressure exerted by the user.

In a switch-type application, one of the extreme positions of the moving part 5, for example the first extreme position (FIG. 6A), is a stable rest position whereas the other extreme position, that is the second extreme position (FIG. 6B), is unstable. The spring plate 54 is in fact fitted on elastic means, such as, for example, a spring (not represented), making it possible to rearm the device 1 according to the invention and thus systematically return the moving part 5 to the stable rest extreme position after operation. The mechanical energy generated by the distortion of the spring plate 54 must therefore be sufficient to unstick the moving part 5 from its bearing lands 314, 323 (FIG. 6A) when it is in its first stable extreme position.

In a switch, an operation therefore always provokes a go and a return of the moving part 5 between its first extreme position and its second extreme position. In the go movement, a first variation of the magnetic flux passing through the coil 2 is produced and therefore a first current is created, and on the return movement, the second variation of the magnetic flux through the coil 2 is produced and therefore a second electric current is created. A single operation therefore makes it possible to double the quantity of electrical energy produced.

According to an embodiment variant of the inventive device represented in FIG. 7, the magnetic circuit comprises a fixed part 3' and a moving part 5'. As in the device described hereinabove, the fixed part 3' comprises two portions 31', 32' passing twice through the central opening of the keeper of the coil 2. Furthermore, the fixed part 3' comprises, outside the coil 2, two unconnected portions between which the moving part 5' is positioned. The moving part 5' comprises, for example, a cylinder of ferromagnetic material presenting at its periphery a portion consisting of a permanent magnet 50'. This moving part 5' is operated to rotate about its axis of revolution (R'), between the two unconnected portions of the fixed part 3' of the magnetic circuit. According to this variant, the rotation axis (R') of the moving part 5' is vertical and perpendicular to the longitudinal axis (A) of the central opening of the keeper of the coil 2. The overall operation of this variant is identical to that described previously, that is, the rotation movement of the moving part 5' about its axis (R') creates a variation of the magnetic flux passing through the coil 2 leading to the creation of an electric current.

Obviously it is possible, without departing from the spirit of the invention, to devise other variants and refinements of detail and even to consider the use of equivalent means.

The invention claimed is:

1. A standalone device for generating electrical energy comprising:
an excitation coil provided with a central opening; and
a magnetic circuit passing through the central opening of the excitation coil, the magnetic circuit including a fixed part and a moving part, the moving part being configured to move relative to the fixed part and vary the magnetic flux through the excitation coil, thereby creating an electric current in the excitation coil,
wherein the fixed part includes at least a first and second arm that each extend through the central opening of the excitation coil, and
an insulating material is disposed within the central opening of the excitation coil between the first and second arms.

2. The device as claimed in claim 1, wherein the fixed part includes only two arms, the only two arms being the first and second arms that each extend through the central opening of the excitation coil.

3. The device as claimed in claim 1, wherein the fixed part includes a seat, the first arm and the second arm are not joined, and the seat is linked to the first and second arms.

4. The device as claimed in claim 3, wherein a permanent magnet is configured to generate a magnetic field that circulates in the magnetic circuit and travels a path passing through the moving part, the first arm, the seat and the second arm, before returning to the moving part, the passage of the magnetic field being in a same direction in both arms.

5. The device as claimed in claim 3, wherein each arm has a free end forming an end stop for the moving part.

6. The device as claimed in claim 3, wherein the seat has a U-shape and includes two parallel legs straddling the excitation coil.

7. The device as claimed in claim 6, wherein the parallel legs of the seat each include a slot to receive one end of one of the first and second arms.

8. The device as claimed in claim 1, wherein the moving part includes a moving permanent magnet configured to perform a rotation movement.

9. The device as claimed in claim 8, wherein the rotation movement of the permanent magnet is a rocker-arm movement performed between two extreme positions delimited by end stops.

10. The device as claimed in claim 9, wherein the moving part is fitted on elastic means stressing the moving part toward one of the extreme positions.

11. The device as claimed in claim 8, wherein the moving part has an H-shape and includes the permanent magnet held between two parallel ferromagnetic layers.

12. The device as claimed in claim 11, wherein the permanent magnet has a direction of magnetization that is perpendicular to planes defined by the two ferromagnetic layers.

13. The device as claimed in claim 1, wherein the moving part is configured to be operated manually.

14. The device as claimed in claim 1, wherein the standalone device is manufactured using MEMS technology.

15. A remote control device comprising:
a transmitter coupled to a remote receiver; and
a standalone device for generating electrical energy as claimed in claim 1, configured to generate an electric current to power the transmitter.

16. A standalone device for generating electrical energy, comprising:
an excitation coil provided with a central opening; and
a magnetic circuit passing through the central opening of the excitation coil, the magnetic circuit including a fixed part and a moving part, the moving part being configured to move relative to the fixed part and vary the magnetic flux through the excitation coil, thereby creating an electric current in the excitation coil,
wherein the fixed part includes a plurality of arms that each extend through the central opening of the excitation coil, the fixed part includes a seat, the plurality of arms include a first arm and a second arm that are not joined, and the seat is linked to the first and second arms, and
the seat has a U-shape and includes two parallel legs straddling the excitation coil.

17. The device as claimed in claim 16, wherein the parallel legs of the seat each include a slot to receive one end of one of the arms.

18. A standalone device for generating electrical energy, comprising:

an excitation coil provided with a central opening; and a magnetic circuit passing through the central opening of the excitation coil, the magnetic circuit including a fixed part and a moving part, the moving part being configured to move relative to the fixed part and vary the magnetic flux through the excitation coil, thereby creating an electric current in the excitation coil, wherein the fixed part includes at least a first and second arm that each extend through the central opening of the excitation coil, and the first and second arms are each made of a conductive material, and the first and second arms are separated from each other within the central opening of the excitation coil such that the conductive materials of the first and second arms are separated a distance from each other.

19. The device as claimed in claim 1, wherein the insulating material is a plastic material.

* * * * *